United States Patent [19]

Frey

[11] 4,002,635
[45] Jan. 11, 1977

[54] ISOINDOLINONE COMPOUNDS USEFUL IN PREPARING HEAVY METAL CONTAINING PIGMENTS

[75] Inventor: Christoph Frey, Oberwil, Switzerland

[73] Assignee: Ciba-Geigy Corporation, Ardsley, N.Y.

[22] Filed: May 8, 1975

[21] Appl. No.: 575,672

Related U.S. Application Data

[62] Division of Ser. No. 417,849, Nov. 21, 1973, Pat. No. 3,897,439.

[30] Foreign Application Priority Data

Dec. 4, 1972 Switzerland ............... 17625/72

[52] U.S. Cl. .................. 260/304 R; 260/307 D; 260/309.2
[51] Int. Cl.² ............ C07D 417/00; C07D 413/00; C07D 403/00
[58] Field of Search ......... 260/304 C, 307 D, 309.2

[56] References Cited

UNITED STATES PATENTS

| | | | |
|---|---|---|---|
| 2,255,128 | 9/1941 | Riester | 260/304 C |
| 3,897,439 | 7/1975 | Frey | 260/309.2 |

*Primary Examiner*—R. J. Gallagher
*Attorney, Agent, or Firm*—Vincent J. Cavalieri

[57] ABSTRACT

Isoindolinone pigments of the formula

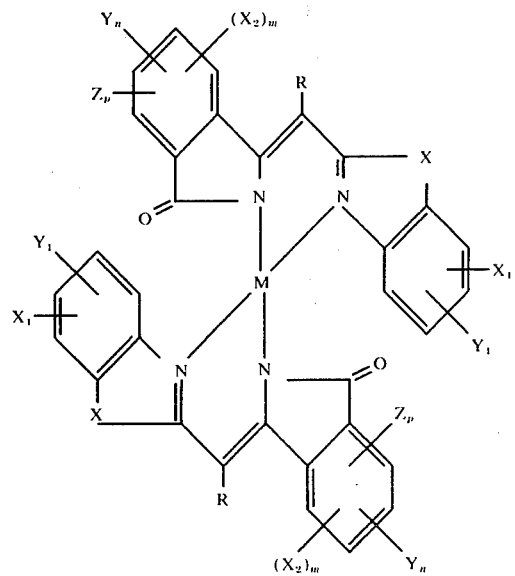

wherein M denotes a polyvalent metal atom other than an alkaline earth, R denotes an organic radical, X denotes an O or S atom or an imino group, $X_1$ and $Y_1$ denote H or halogen atoms, alkyl, alkoxy, alkoxycarbonyl, alkylsulphonyl or alkylcarbamoyl groups containing 1–6 C atoms, or nitro, carbamoyl or aralcarbamoyl groups, or the radicals $X_1$ and $Y_1$ form a fused benzene ring, $X_2$ denotes an H atom, Y denotes a halogen atom and Z denotes a nitro, a carbamoyl or phenylcarbamoyl group, an alkylcarbamoyl group having 2–6 C atoms, or a group of the formula $R_1Y_2$, wherein $R_1$ represents an H atom, an alkyl or cycloalkyl group containing 1–6 C atoms or an aralkyl or aryl group and $Y_2$ represents an O or S atom, m denotes 0–4, n denotes 0–4 and p denotes 0–3 and the sum of m+n+p must be 4, are useful for coloring plastics and lacquers in yellow to orange shades of excellent fastness properties.

1 Claim, No Drawings

ISOINDOLINONE COMPOUNDS USEFUL IN PREPARING HEAVY METAL CONTAINING PIGMENTS

This is a divisional of application Ser. No. 417,849 filed on Nov. 21, 1973, now U.S. Pat. No. 3,897,439, which issued on July 29, 1975.

The present invention relates to new isoindolinone pigments of the formula

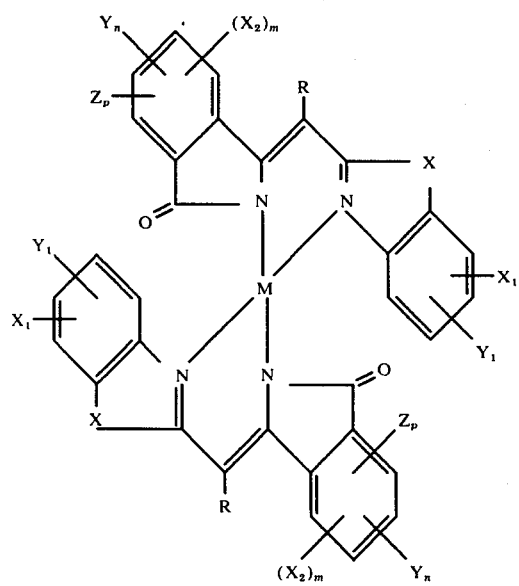

wherein M denotes a polyvalent metal atom with the exception of the alkaline earth metals, R denotes an organic substituent, X denotes an O or S atom or an imino group, $X_1$ and $Y_1$ denote H or halogen atoms, alkyl, alkoxy, alkoxycarbonyl, alkylsulphonyl or alkylcarbamoyl groups containing 1 – 6 C atoms or nitro, carbamoyl, arylcarbamoyl groups or the radicals $X_1$ and $Y_1$ form a fussed benzene ring, $X_2$ denotes an H atom, Y denotes a halogen atom, Z denotes a nitro group a carbamoyl, phenylcarbamoyl or an alkyl carbamoyl group having 2–6 C atoms or a group of the formula $R_1Y_2$-, wherein $R_1$ represent an H atom, an alkyl or cycloalkyl group containing 1–6 C atoms or an aralkyl or aryl group and $Y_2$ represents an O or S atom and $m$ denotes 0 – 4, $n$ denotes 0 – 4 and $p$ denotes 0 – 3, the sum of $m+n+p$ having to be 4.

In the indicated formula, R preferably represents an alkyl, phenyl, cyano, carboxylic acid ester or carboxylic acid amide group or a group of the formula

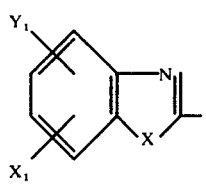

Pigments of particular interest are those of the formula

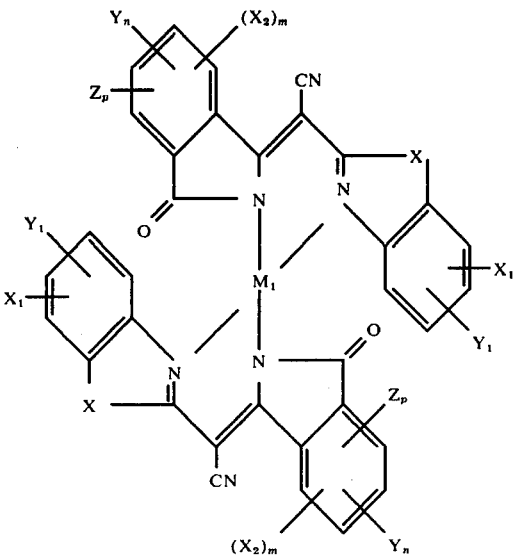

wherein $M_1$ denotes a cobalt, copper or nickel atom and X, Y, Z, $X_1$, $Y_1$, $X_2$, $m$, $n$ and $p$ have the indicated meaning.

The dyestuffs of the present invention are obtained when isoindolinones of the formula

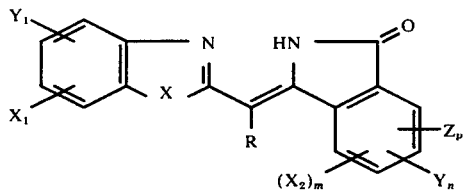

are treated with agents which donate polyvalent metals other than the alkaline earths.

The isoindolinones which serve as starting substances are new compounds which can in part be used for the bulk dyeing of hydrophobic fibres, especially polyester fibres. They are obtained according to known processes by condensation of an azole of the formula

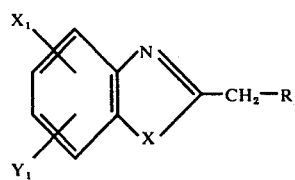

especially of the formula

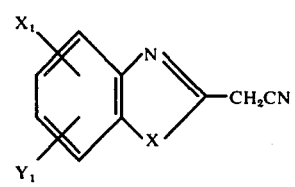

with an isoindolinone of the formula

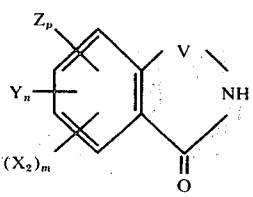

in which formulae R, X, Y, Z, $X_1$, $Y_1$, $X_2$, $m$, $n$, and $p$ have the indicated meaning and V denotes a group of the formula

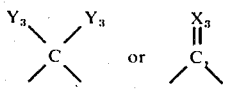

wherein $X_3$ denotes an imino or thio group and $Y_3$ denotes a halogen atom, a lower alkoxy group or a secondary amino group.

Oxazoles, thiazoles or especially imidazoles may be mentioned as azoles, examples being 2-cyanomethyl-benzimidazole, 2-cyanomethyl-4-chloro-benzimidazole, 2-cyanomethyl-5-chloro-benzimidazole, 2-cyanomethyl-5,6-dichlorobenzimidazole, 2-cyanomethyl-4-chloro-6-methyl-benzimidazole, 2-cyanomethyl-5-methoxy-benzimidazole, 2-cyanomethyl-6-ethoxybenzimidazole, 2-cyanomethyl-6-nitro-benzimidazole, 2-cyanomethyl-6-cyano-benzimidazole, 2-cyanomethyl-5-methylsulphonyl-benzimidazole, benzimidazolyl-2-acetic acid amide, benzimidazolyl-2-acetic acid methylamide, benzimidazolyl-2-acetic acid phenylamide, benzimidazolyl-2-acetic acid methyl ester, benzimidazolyl-2-acetic acid ethyl ester, benzimidazolyl-2-acetic acid phenyl ester, bis-(2-benzimidazolyl)-methane, 2-cyanomethyl-benzthiazole, 2-cyanomethyl-5-chlorobenzthiazole, 2-cyanomethyl-6-chloro-benzthiazole, 2-cyanomethyl-7-chloro-benzthiazole, 2-cyanomethyl-5-methyl-benzthiazole, 2-cyanomethyl-6-methyl-benzthiazole, 2-cyanomethyl-5-methoxy-benzthiazole, 2-cyanomethyl-6-methoxy-benzthiazole, benzthiazolyl-2-acetic acid amide, benzthiazolyl-2-acetic acid methylamide, benzthiazolyl-2-acetic acid phenylamide, 2-ethyl-benzimidazole, 2-benzyl-benzimidazole, 2-cyanomethyl-6-trifluoromethyl-benzimidazole, 2-ethyl-benzthiazole, 2-benzyl-benzthiazole, 2-ethyl-benzoxazole, 2-benzyl-benzoxazole, bis-(2-benzthiazolyl)-methane, 2-cyanomethyl-benzoxazole, benzoxazolyl-2-acetic acid amide, bis-(2-benzoxazolyl)-methane and (2-benzoxazolyl)-(2'-benzimidazolyl)-methane.

Isoindolinones which can be used are preferably the 3-imino-isoindolinones or 3,3-dimethoxyisoindolinones or the alkali metal salts of the 3,3-dimethoxyisoindolinones. As examples there may be mentioned: 3,3-dimethoxy-4,5,6,7-tetrachloro-isoindolinone-1, 3-imino-5,6-dichloro-isoindolinone-1, 3,3,6-trimethoxy-4,5,7-trichloro-isoindolinone-1, 3-imino-4,5,7-trichloro-6-phenoxy-isoindolinone-1, 3-imino-4,5,7-trichloro-6-methylmercapto-isoindolinone-1, 3,3-dimethoxy-6-butoxy-4,5,7-trichloro-isoindolinone-1, 3-imino-7-chloro-4-phenylmercapto-isoindolinone-1, 3,3,6-trimethoxy-4,5,7-tribromo-isoindolinone-1, 3,3,4,6-tetramethoxy-5,7-dichloro-isiondolinone-1, 3-imino-isoindolinone (iminophthalimide), 3,3-dimethoxy-4-nitro-isoindolinone-1, 3,3-dimethoxy-6-nitro-isoindolinone-1, 3,3-dimethoxy-4,6-dichloroisoindolinone-1, 3-imino-6-(phenylcarbamoyl)-isoindolinone-1, 3,3-dimethoxy-4,5,6,7-tetrabromo-isoindolinone-1, 3,3-dimethoxy-5,7-dichloro-4,6-diphenoxy-isoindolinone-1, 3,3-dimethoxy-4,5,7-trichloro-6-(4'-chlorophenoxy)-isoindolinone-1, 3-imino-4,5,6,7-tetrachloro-isoindolinone-1, 3,3-dimethoxy-4,7-dichloro-isoindolinone-1, 3,3-dimethoxy-4-chloro-isoindolinone-1, 3,3-dimethoxy-6-iodo-isoindolinone-1, 3-imino-5- or 6-phenyl-isoindolinone, 3,3-dimethoxy-5,7-dichloro-4,6-dimethylmercapto-isoindolinone-1, 3,3-dimethoxy-4,5,7-trichloro-6-ethoxy-isoindolinone-1 and 3,3-bismorpholino-4,5,6,7-tetrachloro-isoindolinone-1.

Both the 3-imino-isoindolinones and the 3,3-dimethoxyisoindolinones are known compounds. The former can be obtained, for example, by reaction of phthalonitrile with alcoholic hydrochloric acid and the latter by treating the corresponding o-cyanobenzoic acid methyl esters with sodium methylate in methanol. It is also possible to dispense with isolating the 3-iminoisoindolinones and to treat the phthalonitriles, for example in ethylene glycol monoethyl ether, with aqueous sodium hydroxide solution and add the azole, in the same vessel, in order to carry out the condensation.

The condensation is appropriately carried out in an organic solvent, for example an alcohol, such as methanol, ethanol, isopropanol or ethylene glycol monoethyl ether, glacial acetic acid or dimethylformamide, at elevated temperature.

Since the condensation products obtained are sparingly soluble in the solvents mentioned, they can easily be isolated by filtration. Any impurities can be removed by elution.

To convert them into the metal complexes, the isoindolinones obtained are treated with agents which donate polyvalent transition metals or zinc or cadmium, but especially nickel, copper and cobalt. Preferably, the formates, acetates or stearates of these metals are used, for example nickel-(II) acetate, copper-(II) acetate, cobalt-(II) acetate or cobalt-(III) acetylacetonate. The metallisation is suitably carried out in one of the abovementioned solvents or in mixtures thereof or especially in dimethylformamide or diethylene glycol monoethyl ether.

It is also possible to carry out the condensation and metallisation in a one-pot process.

The new dyestuffs are valuable pigments which can be used, in a finely divided form, for pigmenting high molecular organic material, for example cellulose ethers and cellulose esters, such as ethylcellulose, nitrocellulose, cellulose acetate or cellulose butyrate, natural resins or synthetic resins, such as polymerisation resins or condensation resins, for example aminoplasts, especially urea-formaldehyde and melamine-formaldehyde resins, alkyd resins, phenoplasts, polycarbonates, polyolefines, such as polystyrene, polyvinyl chloride, polyethylene, polypropylene, polyacrylonitrile and polyacrylic acid esters, polyamides, polyurethanes or polyesters, rubber, casein, silicone and silicone resins, individually or as mixtures.

It is immaterial whether the high molecular compounds mentioned are in the form of plastic masses or melts, or in the form of spinning solutions, lacquers, paints or printing inks. Depending on the end use, it proves advantageous to use the new pigments as toners or in the form of preparations.

In order to obtain finely divided pigments it is frequently of advantage to subject the pigments to a grinding process.

In the examples which follow the parts, unless otherwise stated, denote parts by weight and the percentages denote percentages by weight.

EXAMPLE 1

16 parts of 2-cyanomethyl-benzimidazole and 19 parts of iminophthalimide hydrochloride in 150 parts of ethylene glycol monoethyl ether are heated to 130° – 135° C whilst stirring and kept at this temperature for 3 hours. After cooling, the precipitate is filtered off, rinsed with methanol and water and dried in vacuo at 80° – 100° C. A yellow crystalline powder of the formula

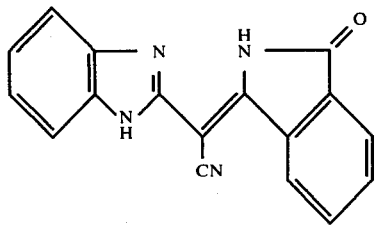

is obtained.

EXAMPLE 2

To form the complex, 11.44 parts of the compound obtained in Example 1, in 100 parts of dimethylformamide, are heated, with addition of 3.89 parts of nickel acetate, to 150° C for 16 hours, whilst stirring. The precipitate which has separated out is filtered off hot and washed with hot o-dichlorobenzene, cold methanol and water. A yellow pigment powder is obtained which is brought to a finely divided state, for example by grinding in isopropanol with the aid of grinding bodies. When milled into polyvinyl chloride, the pigment powder gives a yellow film of good fastness to migration and light. A lacquer pigmented with the nickel complex obtained shows very good stability to light and weathering.

EXAMPLE 3

If the 3.89 g of nickel acetate are replaced by 5.48 g of cobalt acetate.4H$_2$O or by 4.4 g of copper acetate.H$_2$O and in other respects the same procedure is followed, yellow pigment powders are again obtained which when milled into polyvinyl chloride or used to pigment lacquers display similarly good fastness properties.

EXAMPLE 4

16 parts of 2-cyanomethyl-benzimidazole in 200 parts of glacial acetic acid, together with 30 parts of tetrachloroiminophthalimide, are kept for 3 hours at the boil, whilst stirring. After cooling, the yellow crystal powder is filtered off and thoroughly rinsed with methanol water. hot water. It corresponds to the formula

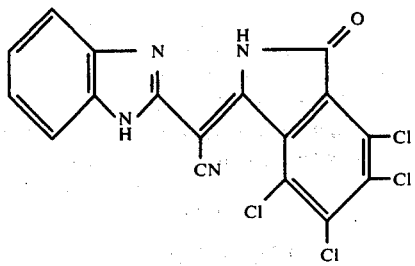

EXAMPLE 5

33.1 parts of 4,5,6,7-tetrachloro-3,3-dimethoxyisoindolinone are dissolved in 80 parts of methanol with addition of 100 parts by volume of methanolic 1 N sodium methylate solution. 15.7 parts of 2-cyanomethyl-benzimidazole are then added and the mixture is stirred for 2 hours at room temperature. It is now heated to the refluxing temperature and after 1 hour 20 parts of glacial acetic acid are added. The suspension is kept under reflux for approx. 4 hours longer, whilst stirring, and is then allowed to cool. After filtration, the product obtained is thoroughly eluted with methanol and water and dried in vacuo at 80° – 100° C. It is identical with the product obtained in Example 4.

EXAMPLE 6

To form the complex, 8.48 parts of the product from Example 4 or 5 in 100 parts of dimethylformamide are reacted with 4.4 parts of copper acetate.H$_2$O in accordance with Example 2, and the mixture is worked up. A pigment is obtained which when milled, in a finely divided form, into polyvinyl chloride, gives a brownish-yellow film of good fastness to light.

EXAMPLE 7

The corresponding nickel complex which is manufactured as in Example 6 with 3.89 parts of nickel acetate instead of the 4.4 parts of copper acetate.H$_2$O when milled, in a finely divided form, into polyvinyl chloride gives a reddish-tinged yellow film of good fastness properties. A lacquer pigmented therewith shows good fastness to light and to weathering.

EXAMPLE 8

14.6 parts of 2-ethylbenzimidazole and 19 parts of iminophthalimide hydrochloride in 100 parts of N-methyl-pyrrolidone are heated to 170° – 175° C for 45 minutes, whilst stirring. After cooling, the mass is poured into 1,000 parts of water, the mixture is filtered and the product is rinsed with cold water. A yellow powder is obtained, which can be recrystallised from dimethylformamide. It has the following formula

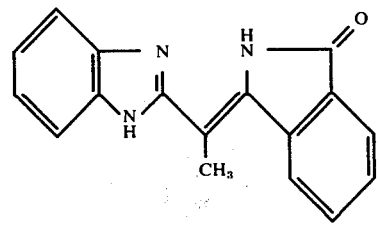

EXAMPLE 9

2.9 parts of the dyestuff obtained according to Example 8 and 1.03 parts of nickel acetate in 100 parts of diethylene glycol monoethyl ether are heated to 145° – 150° C for 15 hours, whilst stirring. A yellow pigment is obtained, which when milled into polyvinyl chloride gives a yellow film having good fastness to migration and to light. A lacquer pigmented with the dyestuff shows good fastness to light and weathering.

EXAMPLES 10–11

If the 1.03 parts of nickel acetate are replaced by the corresponding amount of copper acetate.H₂O or cobalt acetate.4H₂O, yellow pigments with similar fastness properties are obtained.

EXAMPLE 12

If 20.8 parts of 2-benzylbenzimidazole and 19 parts of iminophthalimide hydrochloride in 100 parts of N-methylpyrrolidone are heated to 170° – 175° C for 2 hours and in other respects the procedure indicated in Example 8 is followed, the dyestuff of the formula

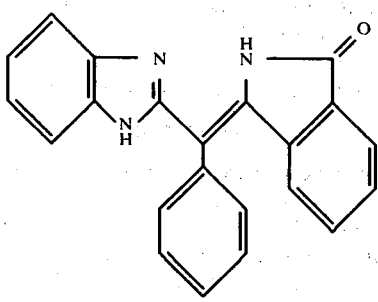

is obtained as a yellow powder, which can be recrystallised from ethylene glycol monoethyl ether/water mixture.

EXAMPLE 13

To form the Cu complex, 3.37 parts of the dyestuff obtained according to Example 12, in 100 parts of diethylene glycol monoethyl ether, are heated with 1.1 parts of copper acetate.H₂O to 145° – 150° C for 15 hours, whilst stirring. The pigment is filtered off hot and washed with hot o-dichlorobenzene, cold methanol and water. When milled into polyvinyl chloride, it gives a yellow film of good fastness properties. A lacquer pigmented therewith shows very good fastness to light and to weathering.

EXAMPLE 14

20.2 parts of 5-nitro-benzimidazolylacetonitrile, 19 parts of iminophthalimide hydrochloride and 9 parts of sodium acetate or 7.5 parts of 30% strength sodium hydroxide solution in 200 parts of ethylene glycol monoethyl ether are heated to 130° – 135° C whilst stirring and kept for 3 hours at this temperature. After cooling, the precipitate is filtered off, rinsed with methanol and water and dried in vacuo at 80° – 100° C. A yellow crystal powder of the formula

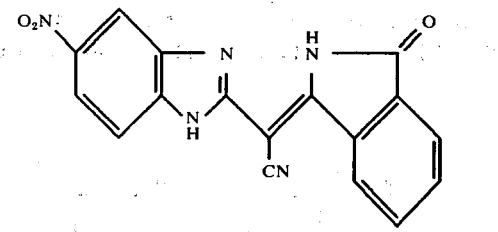

is obtained.

EXAMPLE 15

To form the complex, 3.31 parts of the dyestuff obtained according to Example 14 are reacted with 0.97 part of nickel acetate in accordance with the process of Example 9. A pigment is obtained, which when milled into polyvinyl chloride gives a yellow film.

EXAMPLES 16–17

If instead of nickel acetate equivalent amounts of copper acetate or cobalt acetate are used and the procedure of Example 9 is again followed, pigments which impart a reddish-tinged yellow colour to polyvinyl chloride film are obtained. The lacquers pigmented therewith are also reddish-tinged yellow and possess good fastness properties.

EXAMPLES 18–39

The table which follows lists further pigments with similar fastness properties which are obtained when the azole derivatives indicated in Column I are condensed with the iminophthalimides indicated in Column II and the resulting condensation products are metallised with the metal salts indicated in Column III. Column IV indicates the shade.

Table I

| Example | Azole derivative | Iminophthalimide | Metal salt | Shade |
|---|---|---|---|---|
| 18 | Cl-benzimidazole-CH₂—CN | NH·HCl phthalimide | Ni acetate | yellow |
| 19 | " | " | Co acetate | yellow |
| 20 | " | " | Cu acetate | greenish-tinged yellow |
| 21 | CH₃-benzimidazole-CH₂CN | " | Ni acetate | yellow |

Table I-continued

| Example | Azole derivative | Iminophthalimide | Metal salt | Shade |
|---|---|---|---|---|
| 22 | " | " | Cu acetate | yellow |
| 23 | " | " | Co acetate | yellow |
| 24 | 5,6-dimethyl-2-cyanomethyl-benzimidazole | " | Ni acetate | reddish-tinged yellow |
| 25 | " | " | Co acetate | yellow |
| 26 | " | " | Cu acetate | yellow |
| 27 | 5-ethoxy-2-cyanomethyl-benzimidazole | " | Ni acetate | yellow |
| 28 | " | " | Co acetate | reddish-tinged yellow |
| 29 | " | " | Cu acetate | yellow |
| 30 | 2-cyanomethyl-benzimidazole (open form) | 5-carbamoyl-iminophthalimide · HCl | Ni acetate | yellow |
| 31 | " | " | Co acetate | yellow |
| 32 | " | " | Cu acetate | yellow |
| 33 | 6-ethoxy-2-cyanomethyl-benzimidazole | " | Ni acetate | reddish-tinged yellow |
| 34 | " | " | Co acetate | reddish-tinged yellow |
| 35 | " | " | Cu acetate | reddish-tinged yellow |
| 36 | 2-cyanomethyl-benzothiazole | iminophthalimide · HCl | Ni acetate | reddish-tinged yellow |
| 37 | " | " | Co acetate | reddish-tinged yellow |
| 38 | " | " | Cu acetate | greenish-tinged yellow |
| 39 | 2-cyanomethyl-benzimidazole | iminophthalimide | $Co^{III}$ acetylacetonate | yellow |

EXAMPLE 40

3.68 parts of 2-cyanomethyl-benzimidazole, 4.37 parts of iminophthalimide hydrochloride and 1.95 parts of nickel acetate in 100 parts of dimethylformamide are heated to 145° – 150° C for 15 hours, whilst stirring. The mixture is then filtered hot and the product is rinsed with hot o-dichlorobenzene, methanol and water and dried in vacuo at 100° C. A yellow pigment powder is obtained, which is identical with that from Example 2.

EXAMPLES 41–42

The reaction mentioned in Example 40 can also be carried out in ethylene glycol monoethyl ether or in water. A similar result is obtained.

EXAMPLE 43

11.4 parts of 4-chloro-3,3-dimethoxy-isoindolinone are dissolved in 60 parts of methanol with the addition of 50 parts by volume of 1 N sodium methylate solution. 8.7 parts of 2-cyanomethylbenzimidazole are then added and the mixture is stirred for 2 hours at room temperature. It is now heated to the reflux temperature and after 1 hour 10 parts of glacial acetic acid are added and the whole is stirred for a further 1 – 2 hours at the same temperature. After cooling, the resulting product of the formula

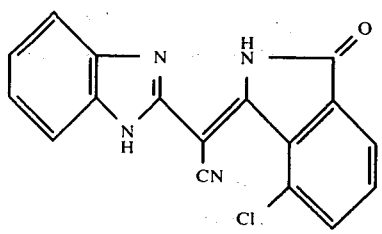

is filtered off, thoroughly eluted with methanol and water and dried in vacuo at approx. 100° C.

EXAMPLES 44–46

The metallisation can be carried out in accordance with Examples 9 - 11 and gives yellow pigments with good fastness to migration, light and weathering.

EXAMPLES 47–76

The table which follows lists further pigments with similar fastness properties, which are obtained when the azole derivatives indicated in Column I are condensed with the 3,3-dimethoxy-isoindolinone indicated in Column II and the resulting condensation products are metallised with the metal salts mentioned in Column III. Column IV indicates the shade in PVC and lacquers.

Table II

| Example | Azole derivative I | 3,3-Dimethoxy-isoindolinone II | Metal salt III | Shade IV |
|---|---|---|---|---|
| 47 | benzimidazole-CH₂—CN | 4-chloro-3,3-dimethoxy-isoindolinone | Ni acetate | greenish-tinged yellow |
| 48 | benzimidazole-CH₂—CN | 4-chloro-3,3-dimethoxy-isoindolinone | Co acetate | yellow |
| 49 | benzimidazole-CH₂—CN | 6-nitro-3,3-dimethoxy-isoindolinone | Co acetate | reddish-tinged yellow |
| 50 | benzimidazole-CH₂—CN | 6-nitro-3,3-dimethoxy isoindolinone | Ni acetate | reddish-tinged yellow |
| 51 | benzimidazole-CH₂—CN | 6-nitro-3,3-dimethoxy-isoindolinone | Cu acetate | reddish-tinged yellow |
| 52 | benzimidazole-CH₂—CN | 4,5,7-trichloro-3,3,6-trimethoxy-isoindolinone | Cu acetate | brownish-tinged yellow |
| 53 | benzimidazole-CH₂—CN | 4,5,7-trichloro-3,3,6-trimethoxy-isoindolinone | Ni acetate | yellow |
| 54 | benzimidazole-CH₂—CN | 4,5,7-trichloro-3,3,6-trimethoxy-isoindolinone | Co acetate | reddish-tinged yellow |
| 55 | benzimidazole-CH₂—CN | 3,3,4,6-tetramethoxy-5,7-dichloroisoindolinone | Ni acetate | yellow |
| 56 | benzimidazole-CH₂—CN | 3,3,4,6-tetramethoxy-5,7-dichloroisoindolinone | Cu acetate | reddish-tinged yellow |

Table II-continued

| Example | Azole derivative I | 3,3-Dimethoxy-isoindolinone II | Metal salt III | Shade IV |
|---|---|---|---|---|
| 57 | benzimidazole-2-CH₂—CN | 3,3,4,6-tetramethoxy-5,7-dichloroisoindolinone | Co acetate | reddish-tinged yellow |
| 58 | benzimidazole-2-CH₂—CN | 3,3-dimethoxy-4,6-diphenoxy-5,7-dichloroisoindolinone | Ni acetate | reddish-tinged yellow |
| 59 | benzimidazole-2-CH₂—CN | 3,3-dimethoxy-4,6-diphenoxy-5,7-dichloroisoindolinone | Co acetate | reddish-tinged yellow |
| 60 | benzimidazole-2-CH₂—CN | 3,3-dimethoxy-4,6-diphenoxy-5,7-dichloroisoindolinone | Cu acetate | reddish-tinged yellow |
| 61 | benzimidazole-2-CH₂—CN | 4,5,6,7-tetrabromo-3,3-dimethoxy-isoindolinone | Co acetate | reddish-tinged yellow |
| 62 | benzimidazole-2-CH₂—CN | 4,5,6,7-tetrabromo-3,3-dimethoxy-isoindolinone | Ni acetate | reddish-tinged yellow |
| 63 | benzimidazole-2-CH₂—CN | 4,5,6,7-tetrabromo-3,3-dimethoxy-isoindolinone | Cu acetate | orange |
| 64 | 6-chloro-benzimidazole-2-CH₂—CN | 6-chloro-3,3-dimethoxy-isoindolinone | Ni acetate | yellow |
| 65 | benzimidazole-2-CH₂—COOCH₃ | 6-chloro-3,3-dimethoxy-isoindolinone | Cu acetate | yellow |
| 66 | benzimidazole-2-CH₂—COOCH₃ | 6-chloro-3,3-dimethoxy-isoindolinone | Co acetate | reddish-tinged yellow |
| 67 | benzimidazole-2-CH₂—COOCH₃ | 6-chloro-3,3-dimethoxy-isoindolinone | Ni acetate | reddish-tinged yellow |
| 68 | benzimidazole-2-CH₂—CONH₂ | 4,5,6,7-tetrachloro-3,3-dimethoxyisoindolinone | Ni acetate | yellow |
| 69 | benzimidazole-2-CH₂—CONH₂ | 4,5,6,7-tetrachloro-3,3-dimethoxyisoindolinone | Cu acetate | brownish-tinged yellow |
| 70 | benzimidazole-2-CH₂—CONH₂ | 4,5,6,7-tetrachloro-3,3-dimethoxyisoindolinone | Co acetate | brownish-tinged yellow |

Table II-continued

| Example | Azole derivative I | 3,3-Dimethoxy-isoindolinone II | Metal salt III | Shade IV |
|---|---|---|---|---|
| 71 | benzothiazole-CH₂-benzothiazole | 4,5,6,7-tetrachloro-3,3-dimethoxyisoindolinone | Co acetate | brownish-tinged yellow |
| 72 | benzothiazole-CH₂-benzothiazole | 4,5,6,7-tetrachloro-3,3-dimethoxy-isoindolinone | Cu acetate | orange |
| 73 | benzothiazole-CH₂-benzothiazole | 4,5,6,7-tetrachloro-3,3-dimethoxy-isoindolinone | Ni acetate | brownish-tinged yellow |
| 74 | benzoxazole-CH₂-benzoxazole | 5-chloro-3,3-dimethoxy isoindolinone | Ni acetate | greenish-tinged yellow |
| 75 | benzoxazole-CH₂-benzoxazole | 5-chloro-3,3-dimethoxy-isoindolinone | Co acetate | greenish-tinged yellow |
| 76 | benzimidazole-CH₂-benzoxazole | 6-iodo-3,3-dimethoxy-isoindolinone | Co acetate | yellow |

EXAMPLE 77

6.6 parts of 4,5,6,7-tetrachloro-3,3-dimethoxyisoindolinone are dissolved in 60 parts of methanol, with the aid of 20 parts by volume of 1 N sodium methylate solution, analogously to Example 5. 3.14 parts of 2-cyanomethylbenzimidazole are then added and the mixture is stirred for one hour at room temperature. 2.6 parts of cobalt acetate. 4H₂O are now added and the mixture is heated to the reflux temperature and stirred thereat for a further 1 – 2 hours. After addition of 5 parts of glacial acetic acid, the whole is kept at the reflux temperature for a further 2 hours, whilst stirring. The mixture is filtered whilst still hot and the pigment powder is rinsed with hot o-dichlorobenzene, cold methanol and water and dried in vacuo at approx. 100° C. When milled into polyvinyl chloride, a reddish-tinged yellow film with good fastness properties is obtained. A lacquer pigmented therewith shows very good fastness to light and to weathering.

EXAMPLE 78

12.8 parts of phthalodinitrile in 100 parts of ethylene glycol monoethyl ether and 20 parts of water are treated with 20 parts of 30% strength sodium hydroxide solution. The reaction commences immediately and the temperature rises to 38° – 40° C. The mixture is stirred for a further 3 hours at approx. 40° C. 15.7 parts of 2-cyanomethyl-benzimidazole are then added, the mixture is heated to approx. 100° C over the course of half an hour, 15 parts of glacial acetic acid are added and the whole is kept at this temperature for a further hour. After cooling, the product is filtered off, rinsed with methanol and water and dried in vacuo at 100° C. The same product as in Example 1 is obtained.

EXAMPLE 79

Non-delustered polyethylene terephthalate granules suitable for the manufacture of fibres are shaken with 1% of the dyestuff according to Example 1 in a vessel which can be closed, on a shaking machine for 15 minutes. The uniformly coloured granules are spun on a melt spinning plant (285° C ± 3° C, dwell time in the spinning machine approx. 5 minutes) to give filaments which are stretched and wound up on a stretch-twisting installation. Because of the solubility of the dyestuff in polyethylene terephthalate vivid yellow dyeings are obtained which are distinguished by outstanding fastness to light, excellent fastness to washing, drycleaning, cross-dyeing and sublimation, high stability to chlorite bleach and very good rub resistance after thermofixing of the dyed material.

EXAMPLE 80

65 parts of stabilised polyvinyl chloride, 35 parts of dioctyl phthalate and 0.2 part of the dyestuff obtained according to Example 2 are stirred together and then milled on a 2-roll calender for 7 minutes at 140° C. A film of yellow colour of very good fastness to light and migration is obtained.

EXAMPLE 81

10 g of titanium dioxide and 2 g of the pigment manufactured according to Example 3 are ground with 88 g of a mixture of 26.4 g of coconut alkyd resin, 24.0 g of melamine-formaldehyde resin (50% solids content), 8.8 g of ethylene glycol monomethyl ether and 28.8 g of xylene for 48 hours in a ball mill.

If this lacquer is sprayed onto an aluminium foil, pre-dried for 30 minutes at room temperature and then stoved for 30 minutes at 120° C, a yellow lacquering is obtained which displays good colour strength and is distinguished by very good fastness to overlacquering, light and weathering.

EXAMPLE 82

(Acrylic resin stoving lacquer)

4 parts of the finely divided pigment according to Example 2 are stirred into 20 parts of a solvent of the following composition: 50 parts of Solvesso 150 (a mixture of aromatic hydrocarbons), 15 parts of butyl acetate, 5 parts of Exkin II (levelling agent based on a ketoxime), 25 parts of methyl isobutyl ketone and 5 parts of silicone oil (1% strength in Solvesso 150).

After the pigment has been entirely distributed finely (in approx. 15–60 minutes, depending on the type of stirrer), the binders are added, namely 48.3 parts of Baycryl L 530 (acrylic resin) (51% strength in 3:1 xylene/butanol) and 23.7 parts of Maprenal TTX (melamine resin) (55% strength in butanol).

After brief homogenisation, the lacquer is applied by customary methods, such as spraying and dipping, or, especially for the continuous coating of sheet metal, by the "coil-coating process, and is stoved (stoving for 30 minutes at 130° C). The resulting yellow lacquerings are distinguished by very good levelling,, high gloss and excellent fine distribution of the pigment and by excellent fastness to weathering.

Instead of the preparation obtained according to Example 1 the preparations obtained according to Examples 2-10 can be employed with equally good success.

EXAMPLES 83 – 91

The following table contains further pigments having similar fastness properties, which are obtained when 2-cyanomethyl-benzimidazole is condensed with the iminoisoindolinones given in Column I and the resulting condensation products metallised with the metal salts listed in Column II. Column III shows the shade of the dyeings obtained in PVC and in lacquers.

| Example | I isoindolinone | II Metal Salt | III Shade |
|---|---|---|---|
| 83 | 3-Imino-5- or 6-(p-chlorophenyl)-carbamoyl-isoindolinone-1 | Ni-acetate | yellow |
| 84 | ″ | Co-acetate | yellow |
| 85 | ″ | Cu-acetate | orange |
| 86 | 3-Imino-5-phenylcarbamoyl-isoindolinone-1 | Ni-acetate | yellow |
| 87 | ″ | Co-acetate | yellow |
| 88 | ″ | Cu-acetate | orange |
| 89 | 3-Imino-5-(p-methylphenyl)-carbamoyl-isoindolinone-1 | Ni-acetate | yellow |
| 90 | ″ | Co-acetate | yellow |
| 91 | ″ | Cu-acetate | orange |

The 3-imino-isoindolinones may be obtained by a known process by reacting alcoholic hydrochloric acid to the corresponding 3,4-dicyano-benzoic acid anilides.

I claim:

1. An isoindolinone of the formula

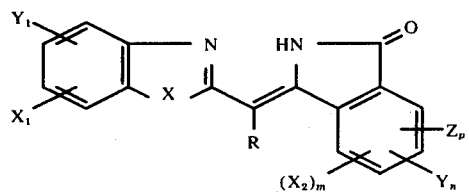

wherein R denotes alkyl containing 1 to 4 carbon atoms, phenyl, cyano, alkoxycarbonyl containing 1 to 5 carbon atoms, phenoxycarbonyl, carbamoyl or a group of the formula

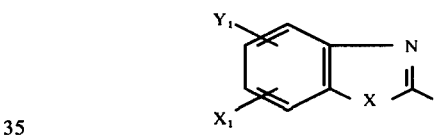

X denotes O, S or imino, $X_1$ and $Y_1$ denote H, halogen, alkyl containing 1 to 6 carbon atoms, alkoxy containing from 1 to 6 carbon atoms, alkoxycarbonyl containing from 1 to 6 carbon atoms, alkylsulphonyl containing from 1 to 6 carbon atoms, alkylcarbamoyl containing 1 to 6 carbon atoms, nitro, carbamoyl or phenylcarbamoyl, or the radicals $X_1$ and $Y_1$ form a fused benzene ring, $X_2$ denotes H, Y denotes halogen and Z denotes nitro, carbamoyl or phenylcarbamoyl selected from the group consisting of parachlorophenylcarbamoyl, phenylcarbamoyl, and para-methylphenylcarbamoyl, or a group of the formula $R_1Y_2$-, wherein $R_1$ represents H, alkyl represents H, from 1 to 6 carbon atoms, cycloalkyl containing 1 to 6 carbon atoms or phenyl and $Y_2$ represents O or S, $m$ denotes 0-4, $p$ denotes 0-3 and the sum of $m+n+p$ must be 4.

* * * * *

UNITED STATES PATENT AND TRADEMARK OFFICE
CERTIFICATE OF CORRECTION

PATENT NO. : 4,002,635
DATED : JANUARY 11, 1977
INVENTOR(S) : CHRISTOPH FREY

It is certified that error appears in the above-identified patent and that said Letters Patent are hereby corrected as shown below:

Column 18, line 49, after "alkyl", delete "represents H," and insert therefor --- containing ---.

Signed and Sealed this twenty-third Day of August 1977

[SEAL]

Attest:

RUTH C. MASON
*Attesting Officer*

C. MARSHALL DANN
*Commissioner of Patents and Trademarks*